United States Patent
Kinlen

(10) Patent No.: US 12,417,859 B2
(45) Date of Patent: *Sep. 16, 2025

(54) CONDUCTIVE COMPOSITIONS OF CONDUCTIVE POLYMER AND METAL COATED FIBER

(71) Applicant: THE BOEING COMPANY, Arlington, VA (US)

(72) Inventor: Patrick J. Kinlen, Fenton, MO (US)

(73) Assignee: The Boeing Company, Arlington, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/538,042

(22) Filed: Dec. 13, 2023

(65) Prior Publication Data

US 2024/0120128 A1 Apr. 11, 2024

Related U.S. Application Data

(62) Division of application No. 17/503,844, filed on Oct. 18, 2021, now Pat. No. 11,875,914, which is a division of application No. 16/012,889, filed on Jun. 20, 2018, now Pat. No. 11,152,131.

(51) Int. Cl.
| | |
|---|---|
| *H01B 1/20* | (2006.01) |
| *C09D 5/24* | (2006.01) |
| *C09D 7/62* | (2018.01) |
| *C09D 163/00* | (2006.01) |
| *C09D 165/00* | (2006.01) |
| *H01B 1/12* | (2006.01) |

(52) U.S. Cl.
CPC ............... *H01B 1/20* (2013.01); *C09D 5/24* (2013.01); *C09D 7/62* (2018.01); *C09D 163/00* (2013.01); *C09D 165/00* (2013.01); *H01B 1/124* (2013.01); *H01B 1/125* (2013.01); *H01B 1/127* (2013.01); *H01B 1/128* (2013.01)

(58) Field of Classification Search
CPC .......... H01B 1/12; H01B 1/124; H01B 1/125; H01B 1/126; H01B 1/127; H01B 1/20; H01B 1/22; H01B 1/24; C09D 5/24; C09D 7/62; C09D 7/70; C08K 3/08; C08K 2003/0862; C08K 2003/0881; C08K 2003/0856; C08K 2003/0843; C08K 2003/085; C08K 2003/0812; C08K 7/02; C08K 7/04; C08K 7/14; C08K 2201/001; C08K 2201/004; C08K 2201/005; C08K 2201/016; C08K 2201/013; H05K 1/092; H05K 1/095; B05D 5/12

See application file for complete search history.

(56) References Cited

U.S. PATENT DOCUMENTS

| | | | | |
|---|---|---|---|---|
| 4,959,430 | A * | 9/1990 | Jonas | H01B 1/127 528/379 |
| 6,110,576 | A | 8/2000 | Decker et al. | |
| 6,331,586 | B1 * | 12/2001 | Thielen | H01B 1/24 524/401 |
| 6,528,572 | B1 * | 3/2003 | Patel | H01B 1/22 977/788 |
| 6,896,828 | B2 * | 5/2005 | Fox | H01B 1/22 252/512 |
| 6,936,191 | B2 * | 8/2005 | Fox | H01B 1/22 252/514 |
| 7,239,381 | B2 * | 7/2007 | Gilton | G01N 21/9501 435/7.1 |
| 7,432,448 | B2 * | 10/2008 | Aisenbrey | B64C 1/12 174/126.2 |
| 7,589,284 | B2 | 9/2009 | Severance et al. | |
| 7,618,680 | B2 | 11/2009 | Gleason et al. | |
| 8,107,153 | B2 * | 1/2012 | Sotzing | D03D 15/54 359/265 |
| 8,394,296 | B2 | 3/2013 | Park et al. | |
| 8,679,371 | B2 | 3/2014 | Li et al. | |
| 9,115,768 | B2 * | 8/2015 | Sturgin | F16D 15/00 |
| 9,117,568 | B2 * | 8/2015 | Scheffer | H01B 1/24 |
| 9,714,370 | B2 | 7/2017 | Mrozek et al. | |
| 9,901,018 | B1 * | 2/2018 | Richmond | H01B 13/24 |

(Continued)

FOREIGN PATENT DOCUMENTS

| | | |
|---|---|---|
| CN | 1585799 A | 2/2005 |
| CN | 102046367 A | 5/2011 |

(Continued)

OTHER PUBLICATIONS

Y. Freeman, et al., Capacitance Stability in Polymer Tantalum Capacitors with PEDOT Counter Electrodes, ECS Journal of Solid State Science and Technology, 6 (7) 2017, 8 pp.

(Continued)

*Primary Examiner* — Matthew R Diaz

(74) *Attorney, Agent, or Firm* — Walters & Wasylyna LLC

(57) ABSTRACT

The present disclosure provides compositions including a conductive polymer; and a fiber material comprising one or more metals disposed thereon. The present disclosure further provides a component, such as a vehicle component, including a composition of the present disclosure disposed thereon. The present disclosure further provides methods for manufacturing a component including: contacting a metal coated fiber material with an oxidizing agent and a monomer to form a first composition comprising a metal coated fiber material and a conductive polymer; and contacting the first composition with a polymer matrix or resin to form a second composition.

20 Claims, 9 Drawing Sheets

(56) References Cited

U.S. PATENT DOCUMENTS

| | | |
|---|---|---|
| 2006/0137587 A1 | 6/2006 | Aisenbrey |
| 2007/0056769 A1 | 3/2007 | Severance et al. |
| 2008/0213466 A1 | 9/2008 | Martin et al. |
| 2009/0303665 A1 | 12/2009 | Oohata |
| 2011/0086206 A1 | 4/2011 | Scheffer et al. |
| 2012/0171358 A1 | 7/2012 | Kim et al. |
| 2014/0093731 A1 | 4/2014 | Bonfiglio et al. |
| 2014/0303470 A1* | 10/2014 | Tsukada ............ H01B 1/127 428/394 |
| 2016/0240322 A1 | 8/2016 | Chien et al. |
| 2017/0207001 A1 | 7/2017 | Vella et al. |
| 2018/0327611 A1* | 11/2018 | Scheffer ............ C09D 11/037 |

FOREIGN PATENT DOCUMENTS

| | | | |
|---|---|---|---|
| CN | 102264810 A | | 11/2011 |
| CN | 102369478 A | | 3/2012 |
| CN | 105473670 A | | 4/2016 |
| CN | 105504276 A | * | 4/2016 |
| EP | 2997581 A1 | | 3/2016 |
| JP | H09279003 A | | 10/1997 |
| JP | 2006279928 A | | 10/2006 |
| JP | 2010059384 A | | 3/2010 |
| JP | 2013049801 A | | 3/2013 |
| WO | 2008130955 A1 | | 10/2008 |

OTHER PUBLICATIONS

Huiling Yang, et al., Assembly of NiO/Ni(OH)2/PEDOT Nanocomposites on Contra Wires for Fiber-Shaped Flexible Asymmetric Supercapacitors, ACS Appl. Mater. Interfaces, 8 (2016), 4 pp.

F. Lallemand, et al., Electrochemical Elaboration of Adherent Poly (3,4-ethylene-diosythiophene) Films and Hybride Nanowires on Nickel, Applied Surface Science, 254 (2008), 6 pp.

Qisen Xie, Vapor-Phase Polymerized Poly(3,4-Ethylenedioxythiophene) on a Nickel Nanowire Array Film: Aqueous Symmetrical Pseudocapacitors with Superior Performance, PLOS One, 11 (11), Nov. 18, 2016, 14 pp.

Chinese Patent Office, First Office Action for Application 201910530078.7 dated Apr. 1, 2022.

Chinese Patent Office, Second Office Action for Chinese Patent Application No. 201910530078.7 dated Nov. 2, 2022.

Japanese Patent Office, Notice of Reasons for Refusal for Application No. 2019-112414 dated Jul. 6, 2023.

Chinese Patent Office, Decision of Rejection for Application 201910530078.7 dated Jun. 29, 2023.

* cited by examiner

CONDUCTIVE COMPOSITIONS OF CONDUCTIVE POLYMER AND METAL COATED FIBER

CROSS-REFERENCE TO RELATED APPLICATIONS

This application is a Division of pending U.S. application Ser. No. 17/503,844 filed Oct. 18, 2021 which claims benefit of and priority to granted U.S. application Ser. No. 16/012,889 filed Jun. 20, 2018, now U.S. Pat. No. 11,152,131, granted Oct. 19, 2021, which are hereby incorporated in their entirety.

FIELD

Aspects of the present disclosure provide compositions including coated fibers, metal substrates having compositions disposed thereon, vehicle components having a metal substrate, and methods for making a metal coated fiber material having an electrically conductive polymer disposed thereon.

BACKGROUND

Vehicles, such as aerospace vehicles, are being designed and manufactured with greater percentages of composites than ever before. For example, composites may be used in the construction of various primary and secondary structures in aerospace applications, such as composite panels forming the airframe and/or exterior skin (e.g., fuselage, wings, etc.) of an aircraft. Use of composites may increase the strength and provide a longer service life of various components of the aerospace vehicle.

For aerospace vehicles having composite components, such as skin panels, it may be desirable to apply additional materials for lightning strike protection and/or to further reduce external electromagnetic interference (if any) associated with avionics and electronics of the vehicle. Nonetheless, such additional materials may undesirably increase the weight of the vehicle and increase the time and cost of production. Furthermore, forming a composite component having high conductivity involves a large amount of the conductive materials as part of the composite component.

There is a need for composites having reduced amount of conductive material to further improve overall composite component strength and ductility while maintaining or improving composite electrical properties. There is also a need for methods for making electrically conductive composites and components having electrically conductive composite disposed thereon.

SUMMARY

The present disclosure provides compositions including a conductive polymer and a fiber material having one or more metals disposed thereon.

In other aspects, a component includes a composition of the present disclosure disposed thereon. A component can include a metal.

In other aspects, a method for manufacturing a component includes: contacting a metal coated fiber material with an oxidizing agent and a monomer to form a first composition comprising a metal coated fiber material and a conductive polymer; and contacting the first composition with a polymer matrix or resin to form a second composition.

BRIEF DESCRIPTION OF THE DRAWINGS

So that the manner in which the above recited features of the present disclosure can be understood in detail, a more particular description of the disclosure, briefly summarized above, may be had by reference to aspects, some of which are illustrated in the appended drawings. It is to be noted, however, that the appended drawings illustrate only typical aspects of this present disclosure and are therefore not to be considered limiting of its scope, for the present disclosure may admit to other equally effective aspects.

To facilitate understanding, identical reference numerals have been used, where possible, to designate identical elements that are common to the figures. It is contemplated that elements and features of one aspect may be beneficially incorporated in other aspects without further recitation.

DETAILED DESCRIPTION

Figure 1:
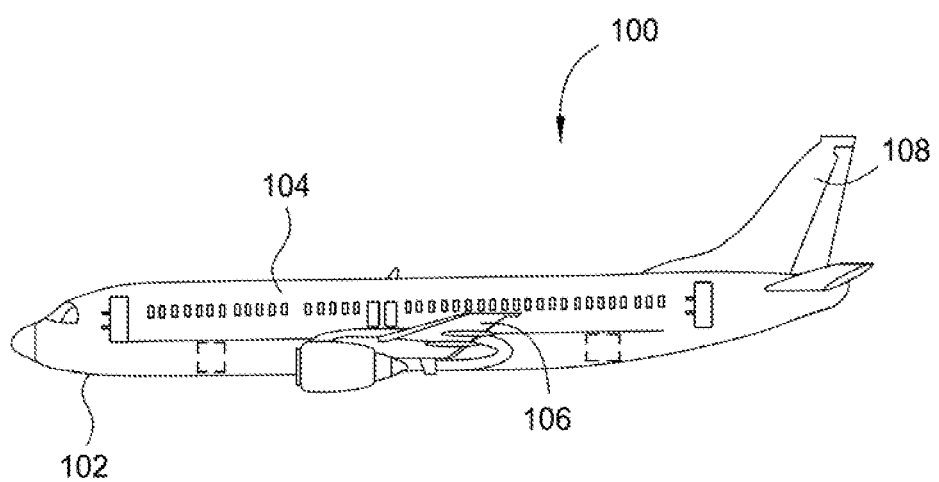
FIG. 1 is an aircraft comprising vehicle components according to one aspect.

Aspects of the present disclosure provide compositions including coated fibers, metal substrates having compositions disposed thereon, vehicle components having a metal substrate, methods for making a metal coated fiber material having an electrically conductive polymer disposed thereon. Compositions include a conductive polymer and a metal coated fiber. For example, a composition can include the contact product of a conductive polymer and a metal coated fiber. In at least one aspect, a conductive polymer is disposed on a metal coated fiber. Compositions can further include a polymer matrix or resin. As used herein, "composition" includes a mixture of components, the reaction product(s), and/or contact product(s) of the components. The present disclosure further provides metal substrates having a composition of the present disclosure disposed thereon. As used herein, a metal substrate includes pure metal substrates and metal-containing substrates. Methods for manufacturing compositions of the present disclosure include contacting (e.g., coating) a metal coated fiber with a conductive polymer or one or more monomers configured to form a conductive polymer. Methods can further include oxidizing a surface of the metal coated fiber with an oxidizing agent before contacting the metal coated fiber with the conductive polymer or the monomers. Compositions and methods of the present disclosure provide conductive materials, such as conductive composites, with improved electrical properties. For example, a composition of the present disclosure including a conductive polymer, metal coated fiber, and polymer matrix or resin can be used as a conductive composite sheet on a vehicle. The amount of conductive composite sheet can be substantially reduced as compared to conventional composite sheets, providing reduced weight to the vehicle. The weight reduction can provide decreased rigidity and brittleness as compared to conventional composite sheets.

Compositions

Compositions of the present disclosure include a conductive polymer and a metal coated fiber. Compositions can further include a polymer matrix or resin.

In at least one aspect, a conductive polymer is selected from a polyaniline (PANI), a poly(ethylenedioxythiophene) (PEDOT), a polypyrrole, a polyfluorene, a polyphenylene, a polypyrene, a polyazulene, a polynaphthalene, a polyacetylene (PAC), a poly(p-phenyl vinylene) (PPV), a polycarbazole, a polyindole, a polyazepine, a polythiophene, or mixtures thereof. Conductive polymers of the present disclosure can provide electrical conductance for static dissipation and/or lightning strike protection of a surface. For example, conductive polymers of the present disclosure can provide electromagnetic interference (EMI) shielding, radiation shielding, ionizing radiation shielding, lightning protection, environmental protection, environmental isolation, scratch resistance, etc. of a surface having a composition of the present disclosure disposed thereon. In at least one aspect, a composition comprises a conductive polymer and metal coated fiber at a % loading of from about 1 wt % to about 30 wt %, such as about 1 wt % to about 20 wt %, such as about 5 wt % to about 15 wt % based on the total weight of the composition. % loading of the present disclosure of conductive polymer and metal coated fiber provides improved overall composite component strength and ductility while maintaining or improving composite electrical properties, as compared to a composition devoid of a metal coated fiber. In addition, % loading of the present disclosure of conductive polymer and metal coated fiber provides reduced overall weight of a composite, as compared to a composition devoid of a metal coated fiber but with the same (or similar) electrical properties. A ratio of conductive polymer to metal coated fiber can be from about 0.002:1 to about 4:1, such as from about 0.004:1 to about 4:1, such as about 0.002:1 to about 2:1. In addition, the metal coated fiber can have an aspect ratio (length divided by diameter) of from about 10 to about 100, such as about 50 to about 100. A higher aspect ratio provides for lower % loading values while maintaining or improving electrical properties.

Metal coated fibers of the present disclosure include neutral metal coated fibers and oxidized metal coated fibers. Metals of the metal coated fiber include any suitable metal for contacting a conductive polymer. A metal can be an elemental metal, such as a neutral or oxidized elemental metal, and/or alloys thereof. In at least one aspect, a metal is selected from nickel, titanium, palladium, iron, cobalt, copper, aluminum, and chromium. Metals of the present disclosure can, in addition to conductive polymers of the present disclosure, provide electrical conductance for static dissipation and/or lightning strike protection of a surface. For example, metals of the present disclosure can provide electromagnetic interference (EMI) shielding, radiation shielding, ionizing radiation shielding, lightning protection, environmental protection, environmental isolation, scratch resistance, etc. of surface having a composition of the present disclosure disposed thereon. In at least one aspect, a metal coated fiber comprises the metal coating from about 15 wt % to about 70 wt %, such as from about 15 wt % to about 30 wt %, based on the total weight of the metal coated fiber.

A fiber can provide increased composite strength and can include carbon (e.g., carbon fibers, such as general purpose HexForce® carbon fibers from Hexcel® Corporation or TORAYCA™ carbon fibers from Toray Industries, Inc.), metallized polymer (e.g., metallized polymer fibers), nylon (e.g., nylon fibers), polyester (e.g., polyester fibers), polyether ether ketone (PPEK) (e.g., PEEK fibers), polyetherketoneketone (PEKK) (e.g., PEKK fibers), fiberglass (e.g., fiberglass fibers), metal meshes or foils (e.g., expanded copper foil), polyacrylonitrile (PAN) (e.g., PAN fibers), electrospun PAN nanofibers, tightly packed, wet-spun carbon nanotube threads, glass fibers (e.g., E-glass, S-glass), aramid fibers (e.g., Kevlar), fluoropolymer fibers (e.g., Ultra High Molecular Weight Polyethylene, High Density Polyethylene, Teflon, etc.), silicon carbide (e.g., silicon carbide fibers), alumina (e.g., alumina fibers), boron (e.g., boron fibers, such as boron fibers from Specialty Materials™), hemp (e.g., hemp fibers), quartz (e.g., quartz fibers), ceramic (e.g., ceramic fibers), basalt (e.g., basalt fibers) and combinations or hybrids thereof (e.g., Hexcel HexForce® hybrid reinforcement fibers from Hexcel® Corporation.).

As noted above, compositions of the present disclosure can further include a polymer matrix or resin. A polymer matrix/resin provides additional strength to a composition of the present disclosure. A matrix material, for example, can provide a medium for binding and holding a fiber-reinforcing sheet and a nanomaterial composite sheet together into a continuous, solid form. In at least one aspect, a polymer matrix/resin is selected from a polyurethane, an epoxy (such as Cycom® 977-3 epoxy resin from Cytec Industries, Inc. of Woodland Park, N.J.), a thermosetting polymer, a thermoplastic polymer, or a rubber. A polymer matrix resin of the present disclosure can include at least one of a thermosetting polymer or a thermoplastic polymer. In at least one aspect, a polymer matrix/resin is at least one of a polyurethane, an epoxy, a bismaleimide, a polyimide, or a polyaryletherketone. Epoxies are thermosets that can provide durable coatings on a component, such as a vehicle component, such as an aircraft component. Bismaleimide resins have desirable formability and mechanical properties similar to epoxies and can operate at higher temperatures than epoxies. Polyaryletherketones are thermoplastics that can provide adhesion of a composition of the present disclosure to a component and can also withstand chemical, thermal, and physical conditions experienced by a vehicle if the component is a vehicle component. Polyimides have higher strains to failure than thermoset polymers because thermoplastic polymers can undergo plastic deformation. In at least one aspect, a composition comprises a polymer matrix or resin from about 1 wt % to about 99 wt %, such as about 50 wt % to about 95 wt %, such as about 80 wt % to about 95 wt % based on the total weight of the composition.

Compositions of the present disclosure can further include a dielectric carrier material. Dielectric carrier material can be UHMWPE, fluoropolymers, polyimides, or a combination thereof. A dielectric carrier material provides some additional advantages in keeping a lightning strike at the surface, and help from allowing the current to get into an underlying composite structure.

In at least one aspect, a substrate comprises a component, such as a vehicle component, and one or more compositions of the present disclosure disposed onto the component. Compositions disposed on a component (e.g., as a layer) are applied from about 0.01 μm to about 100 μm in thickness, such as from about 1 μm to about 50 μm, such as from about 2 μm to about 20 μm, for example about 10 μm. An increase in composition thickness increases resistance, but also adds weight to the composition. Compositions of the present disclosure can provide a fine balance between electrical properties and overall weight. In at least one aspect, compositions have a resistance of from about 0.1 ohms per square (Ω/□) to about 25 Megaohms per square (MΩ/□), such as from about 0.5 ohms per square to about 15 Megaohms per square, such as from about 1 ohms per square to about 10 Megaohms per square, such as from about 2 ohms per square to about 5 Megaohms per square, for example about 3 ohms per square. Conductivity provides electrostatic dissipation.

Resistance. Resistance measurements may be made using any suitable set of electrodes and measurement apparatus, such as a Keithley 4200 SCS. Resistance measurements can be made using the van der Pauw method. The four-point method uses parallel source and sense measurements of current and voltage, respectively, across a sample surface. Current and voltage polarities are switched across each junction to test for ambipolarity. Sample geometry should be held constant and allows for the direct comparison of samples. In order to account for differences in the charge directionality, the current and voltage measurements are rotated across each arrangement, as shown in Table 1.

TABLE 1

Electrode arrangements for resistance measurements

| R | Source I | Sense V |
|---|---|---|
| $R_A$ | 1-2 | 3-4 |
| $R_B$ | 2-3 | 4-1 |
| $R_C$ | 3-4 | 1-2 |
| $R_D$ | 4-1 | 3-2 |

Van der Pauw resistance measurements are performed by forcing a current across two adjacent electrodes and sensing the voltage drop across the sample in a parallel arrangement of electrodes.

The sheet resistance may be calculated from the ratio of V to I from the measured composition. In the case of a sample showing truly isotropic resistance, $R_A=R_B=R_C=R_D$. In the case of isotropic resistances, e.g., where $R_A=R_B$, the sheet resistance is determined by the average of the two measured resistances, as shown in Equation 1 below. For samples with anisotropic resistances (the x-direction and y-direction demonstrate different resistances), calculating the sheet resistance becomes more complicated, which will be addressed in the following paragraph. For all samples where $R_A \neq R_C$ and $R_B \neq R_D$, the measurement is void. Equation 2 shows how the bulk resistivity, ρ, is determined if the composition thickness, d, is known (typically resistivity is reported in Ω·cm, thus comprises the use of d in cm), which is derived from the original Van der Pauw theorem. Bulk resistivity, ρ, can then be used to calculate conductivity, σ (S·cm−1), which is inversely proportional (Equation 2).

$$R_S = \frac{R_A + R_B}{2} \qquad \text{Eqn. 1}$$

$$\rho = \frac{\ln(2)d}{\pi R_S} = \frac{1}{\sigma} \qquad \text{Eqn. 2}$$

For cases where $R_A \neq R_B$, extracting conductivity values from the Van der Pauw equation becomes more difficult. In the case where the conductivity is not isotropic, the conductivity becomes a tensor value with x, y, and z dimensions. In the case of very thin compositions, an accurate conductivity value may be obtained by taking the square of the product of the perpendicular conductivity measurement values, as shown in Equation 3 below. This calculation is only true if the directions being measured align with the tensor axes of the conductivity. It is assumed that the larger of the two resistances measured by the technique is exactly along the lowest conductivity tensor, and the lower of the resistance measurements is exactly along the highest conductivity tensor. If there were a misalignment of the conductivity tensor with the electrode/sample orientation, an inaccurate conductivity value would be measured.

$$\sigma = \sqrt{\sigma_A \cdot \sigma_B} \qquad \text{Eqn. 3}$$

For the van der Pauw measurement chip, the numbers correspond to axis of the measurement while the sigmaX notations ($\sigma_A$, $\sigma_B$, $\sigma_C$) represent the conductivity tensor directions. A mismatch of sample axis and tensor axis leads to inaccurately measured conductivities. The van der Pauw printed electrodes with the Keithley 4200 SCS provide a suitable device test bed for the measurement of samples.

In an effort to control the measurement humidity effects, a small sample probe station may be used to exclusively connect to the Keithley 4200 SCS for accurate van der Pauw measurements on the Dropsens prefabricated electrodes.

Composites

In at least one example, a composition of the present disclosure comprises a polymer matrix/resin and is a composite, as described in more detail below. A composite is solid material having at least two phase-separated constituents with differing intrinsic properties. For example, a composite can be a three dimensional structure of fibers of the present disclosure comingled together (e.g. woven), can be unidirectional tape, or can be a single ply of material. A composite can have a composite structure selected from a mat, a tow, a laminate (a layered structure or a ply), a braid, or a filament. A composite provides multidirectional improvements in conductivity, uniformity of tensile properties and impact strength, and greater electrical uniformity (as compared to unidirectional fibers).

Metal Substrates

In at least one aspect, a metal substrate includes a composition of the present disclosure disposed thereon. Metal substrates include steel, aluminum, titanium, magnesium, tantalum, copper, and alloys thereof. A composition can be disposed (directly or indirectly) on a metal substrate. The composition (disposed on the metal substrate) can have a thickness of from about 1 micron to about 1 millimeter, such as from about 1 micron to about 100 microns, such as from about 1 micron to about 10 microns. The thickness of a composition of the present disclosure disposed on a substrate can be sufficiently thin so as not to add significant weight to the coated substrate but nonetheless provide an adequate amount of composition to provide other benefits, such as corrosion protection of the substrate. A metal substrate can be, or form a component of, a vehicle component. A vehicle component is a component of a vehicle, such as a structural component, such as landing gear(s), a panel, or joint, of an aircraft. Examples of a vehicle component include a rotor blade, an auxiliary power unit, a nose of an aircraft, a fuel tank, a tail cone, a panel, a coated lap joint between two or more panels, a wing-to-fuselage assembly, a structural aircraft composite, a fuselage body-joint, a wing rib-to-skin joint, and/or other internal component.

FIG. 1 is an aircraft comprising vehicle components, according to at least one aspect of the present disclosure. As shown in FIG. 1, aircraft 100 includes an aircraft structure 102 including vehicle components such as an elongated body 104, a wing 106 extending laterally from the body 104, and a tail 108 extending longitudinally from the body 104. Compositions of the present disclosure can be disposed on one or more surfaces of these aircraft components to form one or more aircraft component(s) having a composition disposed thereon.

Alternatively, compositions of the present disclosure can be disposed on one or more components of, for example, a wind turbine, a satellite, or other vehicles such as a car, a boat, and the like.

Fiber Formation

Figure 2:
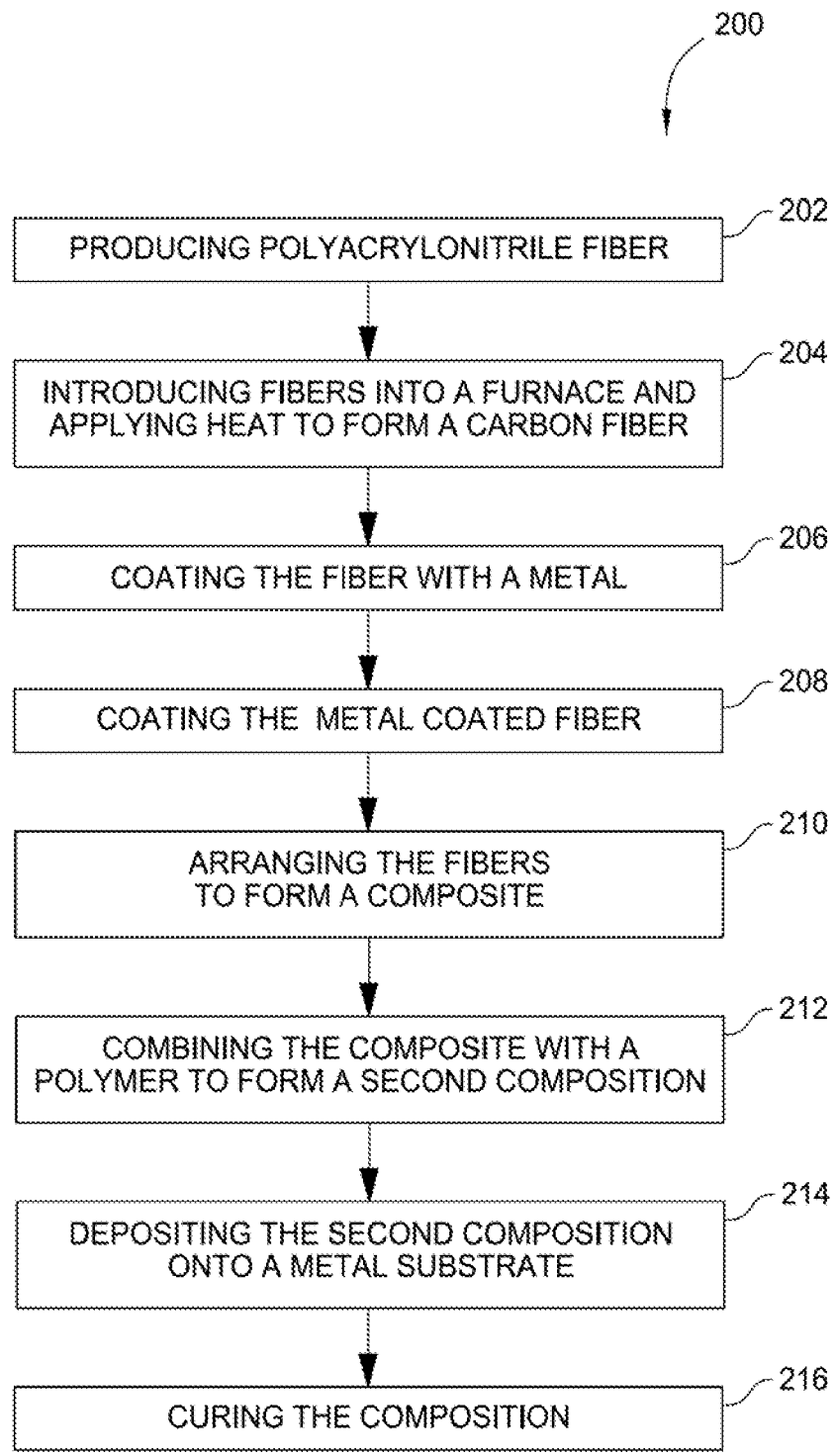
FIG. 2 is a flow diagram of a method for manufacturing components having compositions of the present disclosure disposed thereon, according to one aspect.

In at least one aspect, a fiber (of a metal coated fiber) of the present disclosure can include carbon fibers such as graphene, graphite, and carbon nanotubes. Carbon fibers provide light weight, yet strong fiber material. FIG. 2 is a flow diagram of a method 200 for manufacturing components, such as vehicle components, having compositions of the present disclosure disposed thereon. Graphite, for example, can be produced from a polyacrylonitrile fiber. As shown at block 202, method 200 includes producing polyacrylonitrile (PAN) (an acrylic textile fiber) by wet spinning or dry spinning of the PAN polymer. Dry spinning produces round smooth fibers, whereas wet spinning (extrusion into a coagulating bath) produces a variety of "non-circular" cross-sections, including dog-bone, elliptical, and kidney-shaped cross-sections. These non-circular cross-sections provide a larger relative surface area to improve effective bonding. The fibers can be stretched during the spinning process. The greater the stretch, the smaller the fiber diameter and the higher the preferred orientation of the molecular chain along the fiber axis, resulting in a stiffer carbon fiber when processed. PAN fiber tows can contain from about $10^3$ fibers to about $10^5$ fibers, for example about $10^4$ fibers. To form the carbon fibers (e.g., graphite), PAN is first stabilized in air at about 250° C. by oxidation. At this point, PAN has a glass transition temperature (Tg) sufficient to resist melting at higher temperatures. The fibers are maintained under tension during the stabilization to prevent them from contracting during oxidation and, through the resulting deformation, to align further into a ladder structure with the fiber axis. The material is then carbonized at a temperature from about 1200° C. to 1600° C. in an inert atmosphere, such as inert gas, such as a nitrogen. As this heat treatment proceeds, benzene aromatic rings link to form polynuclear aromatic fragments (e.g., a more graphite-like structure). Gradually the aromatic network transforms to mainly carbon atoms and becomes denser through cross-linking with the evolution of $N_2$ through open pores in the fiber. If the heat treatment is performed at 1500-1600° C., the strain capability of the fibers is then over 1.5% with an intermediate value of the Young's modulus of around 240 GPa.

If a higher modulus is desired, which will lower strength and strain capability of the fibers, the fibers can undergo a final graphitization stage of heat treatment. As shown at block 204, method 200 includes introducing the fibers into a furnace (such as a graphitization furnace) and heating the furnace to a temperature from about 2,000° C. to about 2,700° C., for example about 2500° C. The graphitization heat treatment can occur in an inert atmosphere, such as inert gas, such as argon, which reduces or prevents the formation of imperfections in the fiber. During this process, the aromatic carbon basal layer planes grow, by further coalescence of adjacent layers, resulting in an increase in planar orientation of the fiber into a fiber having a graphite morphology, and thus a more elastic modulus (e.g., from about 300 GPa to about 400 GPa, such as about 380 GPa), as compared to the fiber material that has not undergone this graphitization heat treatment. The fibers (such as carbon fibers) produced herein can have a filament diameter of from about 1 µm to about 20 µm, such as about 8 µm and can form a tow (bundle of filaments) having from about $2\times10^4$ of filaments to about $3\times10^4$ of filaments, such as $2.5\times10^4$ of filaments. Fibers (such as carbon fibers) of the present disclosure can have a thickness of from about 1 µm to about 1 mm, such as from about 1 µm to about 10 µm, and a density of from about 0.5 $g/cm^3$ to about 1 $g/cm^3$, such as about 0.7 $g/cm^3$.

As noted above, fibers of the present disclosure are metal coated fibers. As shown at block 206, method 200 includes coating the fiber with a metal. Metal can be disposed onto a fiber of the present disclosure by any suitable metal deposition process. In at least one aspect, a metal is disposed on a fiber by dipping, chemical vapor deposition, or plating (e.g., electroless plating). A metal coating can have a thickness of from 0.5 microns to about 20 millimeters, such as 0.5 microns to 100 microns, such as from 1 micron to 5 microns.

In at least one example, a metal is deposited onto a fiber by autocatalytic (electroless) plating, which is a plating process which involves deposition without any current applied. The process is a chemical reaction and is autocatalytic. The deposition rate is normally 12.5 µm-25 µm. Although, it has been done up to 650 µm in thickness, the coating is usually less than 50 µm in practice due to the slow deposition rate. The plating thickness tends to be uniform compared to electroplating due to the absence of electric fields. For example, nickel and copper can be used in electroless platings. In the case of nickel, the deposits are dense, relatively hard (43-55 HRC, increase to ~65 HRC after 2 hr at 343° C. and brittle.

Coating The Metal Coated Fiber

As shown at block 208, method 200 includes coating a metal coated fiber with a conductive polymer. Coating the fiber can include a template polymerization coating process or a polymer coating process.

Template Polymerization Coating:

Mixing conductive polymers with metal coated fibers conventionally results in difficulty separating the coated fiber from excess conductive polymer (e.g., conductive polymer that is not disposed in proximity to the metal coated fiber). However, in a template polymerization coating process, monomers are polymerized in the presence of a metal coated fiber to form a polymer in-situ which is disposed onto the metal coated fiber.

Figure 3:
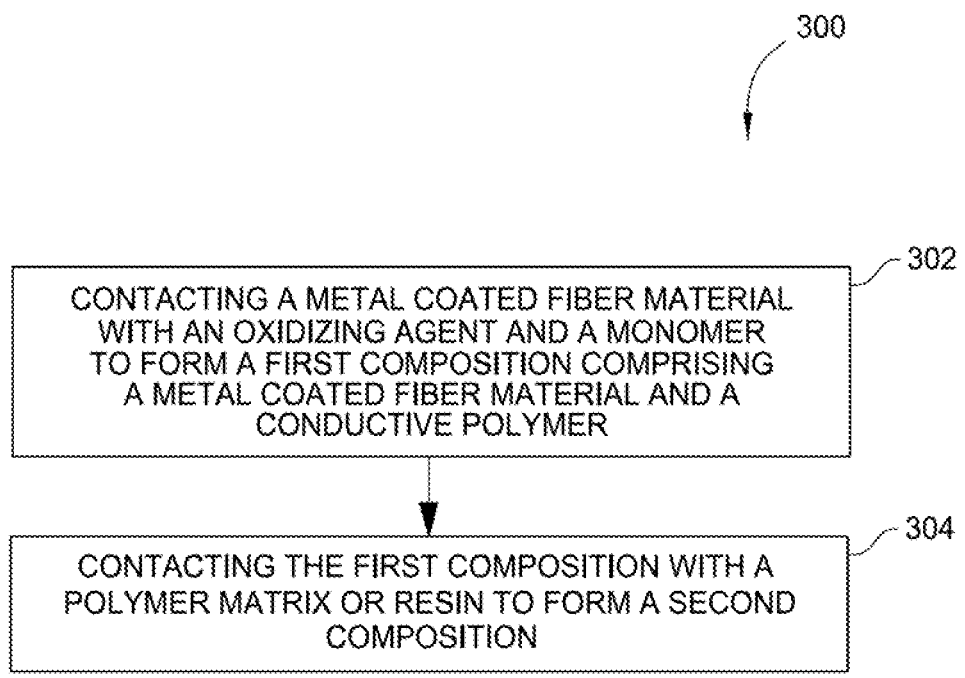
FIG. 3 is a flow diagram of a method for coating a metal coated fiber with a conductive polymer by template polymerization, according to one aspect.

FIG. 3 is a flow diagram illustrating a method 300 for coating a metal coated fiber with a conductive polymer by template polymerization. As shown in FIG. 3, method 300 includes contacting 302 a metal coated fiber material with an oxidizing agent and a monomer to form a first composition comprising a metal coated fiber material and a conductive polymer. Method 300 includes contacting 304 the first composition with a polymer matrix or resin to form a second composition.

In at least one aspect, a surface of the metal coated fiber is oxidized with an oxidizing agent during or before polymerization of monomers. Polymerization of monomers forms a polymer disposed onto a surface, such as an oxidized surface, of the metal coated fiber. An oxidizing agent can be any suitable oxidizing agent capable of oxidizing a neutral metal or alloy surface. Oxidizing agents can include an iron-containing oxidizing agent, cerium-containing oxidizing agent, or sodium-containing oxidizing agent. An oxidizing agent used can be chosen based on oxidative strength. For example, iron-containing oxidizing agents are typically stronger oxidants for metal surfaces than sodium-containing oxidizing agents. A stronger oxidizing agent can provide faster oxidation of a metal surface (e.g., dip and rinse) than a weaker oxidizing agent, but also with consideration to not over oxidize the metal by prolonged exposure to a strong oxidizing agent. In at least one aspect, an iron-containing oxidizing agent is selected from iron-para-toluenesulfonate $(Fe(III)-(PTSA)_3)$, iron permanganate $(Fe(III)-(MnO_4^-)_3)$, ferric nitrate, iron sulfate $Fe(III)_2(SO_4)_3$, iron dichromate $(Fe(III)_2(CrO_4)_3)$, or mixtures thereof. In at least one aspect, a cerium-containing oxidizing agent is selected from cerium (IV) sulfate, ammonium cerium (IV) nitrate, or mixtures thereof. In at least one aspect, a sodium-containing oxidizing agent is selected from sodium dichromate $(Na_2Cr_2O_7)$, NaOCl (bleach), sodium chlorate, sodium chlorite, sodium dichloroiodate, sodium nitrite, sodium perborate, sodium percarbonate, sodium periodate, sodium peroxydisulfate, or mixtures thereof.

In at least one aspect, an oxidizing agent is a potassium-containing oxidizing agent. A potassium-containing oxidizing agent can be selected from potassium ferricyanide, potassium permanganate, potassium peroxydisulfate, potassium peroxomonosulfate, or mixtures thereof.

An oxidizing agent can be ammonium persulfate $((NH_4)_2SO_2O_8)$. Examples of other oxidizing agents include benzoyl peroxide, tert-butyl hydroperoxide, tert-butyl hypochlorite, tert-butyl nitrite, carbon tetrabromide, chloramine-T, chloranil, chloromethyl-4-fluoro-1,4-diazoniabicyclo[2.2.2]octane bis(tetrafluoroborate), 3-chloroperoxybenzoic acid, chromium trioxide, hydrogen peroxide, hydrogen peroxide urea adduct, iodine $(I_2)$, manganese(IV) oxide, osmium tetroxide, oxone, ozone, peracetic acid, periodic acid, a peroxy acid, tert-butyl hydroperoxide, vanadium pentoxide, tert-butyl hypochlorite, or mixtures thereof.

Oxidizing agent can be contacted with the metal coated fiber to form an oxidized metal coated fiber. Oxidizing agent or metal coated fiber can be introduced into a solvent, such as isopropyl alcohol or acetonitrile, before contacting oxidizing agent with the metal coated fiber. In at least one aspect, a concentration of oxidizing agent in solvent is from about 1% w/w to about 50% w/w, such as from about 5% w/w to about 25% w/w, such as from about 7% w/w to about 12% w/w, for example about 8% w/w. The metal coated fiber can be included in the solution to form an oxidized metal coated fiber. A concentration of the metal coated fiber in solvent/solution can be from about 1% w/w to about 50% w/w, such as from about 5% w/w to about 25% w/w, such as from about 10% w/w to about 20% w/w, for example about 15% w/w. A solution of oxidizing agent and metal coated fiber is mixed and optionally heated. Heating can be performed at a temperature of from about 20° C. to about 150° C., such as from about 40° C. to about 80° C., for example about 60° C. Mixing can be performed for from about 1 hour to about 72 hours, such as from about 12 hours to about 48 hours, such as from about 20 hours to about 30 hours, for example about 24 hours. Oxidized metal coated fiber can precipitate from the solution, can be filtered and dried.

Alternatively, oxidized metal coated fiber can be formed by contacting an oxidizing agent with metal coated fiber to form a contact product (e.g., a mixture) and roller milling the contact product. Roller milling can be performed for from about 1 hour to about 72 hours, such as from about 10 hours to about 36 hours, for example about 24 hours. Oxidizing agent or metal coated fiber can be introduced into a solvent, such as isopropyl alcohol or acetonitrile, before contacting oxidizing agent with the metal coated fiber. In at least one aspect, a concentration of oxidizing agent in solvent is from about 1% w/w to about 50% w/w, such as from about 5% w/w to about 25% w/w, such as from about 7% w/w to about 12% w/w, for example about 8% w/w. The metal coated fiber can be included in the solution to form an oxidized metal coated fiber. A concentration of the metal coated fiber in solvent/solution can be from about 1% w/w to about 50% w/w, such as from about 5% w/w to about 25% w/w, such as from about 10% w/w to about 20% w/w, for example about 15% w/w.

Oxidized metal coated fiber is contacted with monomers to form a composition comprising a metal coated fiber having a polymer disposed thereon. In at least one aspect, a monomer is 3,4-ethylenedioxythiophene (EDOT) (which forms poly(3,4-ethylenedioxythiophene) upon polymerization), aniline (which forms polyaniline upon polymerization), pyrrole (which forms polypyrrole upon polymerization), and derivatives or mixtures thereof. Monomers can be introduced into a solvent, such as butylacetate, before contacting oxidized metal coated fiber with the monomers. Oxidized metal coated fiber can be introduced into a solution of monomers. The solution can be mixed and optionally heated. Mixing can be performed for from about 1 minute to about 24 hours, such as from 10 minutes to about 6 hours, such as from about 1 hour to about 3 hours, for example about 2 hours. Heating can be performed at a temperature of from about 20° C. to about 150° C., such as from about 40° C. to about 80° C., for example about 60° C. Metal coated fiber having a polymer disposed thereon can precipitate from the solution, can be filtered and dried (e.g., under vacuum with heat, such as about 60° C.). Alternatively, the solution can be roller milled and optionally heated. Roller milling can be performed for from about 1 minute to about 72 hours, such as from 6 hours to about 36 hours, such as from about 10 hour to about 24 hours, for example about 19 hours. Heating can be performed at a temperature of from about 20° C. to about 150° C., such as from about 40° C. to about 80° C., for example about 60° C. Metal coated fiber having a polymer disposed thereon can be dried (e.g., under vacuum with heat, such as about 60° C.).

Polymer Coating Process:

In a polymer coating process, a polymer is contacted with a metal coated fiber (which may be neutral or oxidized) without the use of monomers to form a polymer disposed onto the metal coated fiber. Although, mixing conductive polymers with metal coated fibers conventionally results in difficulty separating the coated fiber from excess conductive polymer (e.g., conductive polymer that is not disposed in proximity to the metal coated fiber), it has been discovered that some conductive polymers, such as polyaniline and PEDOT-PSS (PSS=polystyrenesulfonate), can be disposed onto metal coated fiber using a polymer coating process of the present disclosure.

Polymer coating includes contacting a conductive polymer with a metal coated fiber to form a metal coated fiber having a polymer disposed thereon. Polymer coating can include introducing a conductive polymer or metal coated fiber into a solvent, such as water, isopropyl alcohol, acetonitrile, or butylacetate to form a solution. A conductive polymer or metal coated fiber is then introduced into the solution and mixed. In at least one aspect, mixing includes sonicating the solution containing conductive polymer and metal coated fiber. Mixing can be performed for from about 30 seconds to about 72 hours, such as from about 1 minute to about 1 hour, such as from about 1 minute to about 30 minutes, such as from about 1 minute to about 10 minutes, for example about 5 minutes. The solvent is then evaporated and the metal coated fiber having a polymer disposed thereon is dried with optional heating (e.g., at a temperature of about 70° C.).

Fiber Composite Formation

At block 210, method 200 includes arranging the (polymer+metal) coated fiber into a composite containing the fibers. (Alternatively, a metal coated fiber is arranged into a composite before performing a conductive polymer coating process.) A composite has a composite structure that is a mat, a tow, a laminate (a layered structure or a ply), a braid, or a filament. A composite can be arranged during manufacture of the vehicle component with the fibers oriented in one or more directions in sufficient concentrations to provide a desired strength and stiffness in the resulting product form after curing. Fiber tows can be woven to produce a fabric, such as a plain weave or satin weave cloth. For in-plane loading, a laminated or plywood type of construction is used including layers or plies of unidirectional or bi-directional orientated fibers. Alternatively, the fibers are arranged by one or more textile techniques, such as weaving, braiding, or filament winding.

Thus, to obtain the desired mechanical properties of a fiber, the fiber layers or plies in a laminate are arranged at angles from about 0° to about 90° relative to a 0° primary loading direction. In at least one aspect, a fiber mat has a combination of 0°, +/−45° C., and 90° C. orientations, which reduces or prevents distortion of the component after cure and under service loading. The laminate is stiffest and strongest (in-plane) in the direction with the highest concentration of 0° fibers, and the laminate is said to be orthotropic.

When the ply configuration is made of equal numbers of plies at 0°+/−60° or 0°, +/−45°, and 90°, the in-plane mechanical properties do not vary much with loading direction and the composite is then said to be quasi-isotropic. Because the quasi-isotropic configuration has a stress concentration factor similar to that of an isotropic material, it is also used where local stresses are high, such as in a mechanical joint.

In at least one aspect, a fiber composite is cowoven with one or more additional fibers/composites. Additional fibers include glass or aramid fibers. In at least one aspect, one or more additional fibers are woven in the 0° or warp direction (the roll direction) or in the 90° (weft) direction.

In at least one aspect, forming a fiber composite includes holding a carbon fiber in a stationary position using a knitting yarn during weaving to avoid fiber crimping (waviness). These non-crimp fabrics can contain fibers orientated at 0°, 90°, and +/−45° in any desired proportions. Because of the reduction or elimination in fiber waviness, composites based on non-crimp fabric show a significant improvement in compression strength compared with those based on woven materials. Stiffness in both tension and compression is also increased by about 10% as compared with composites based on woven materials.

Composition and Component Formation

At block 212, method 200 includes combining a first composition (e.g., the fiber composite) with a polymer matrix/resin to form a second composition. The first composition comprises a metal coated fiber comprising a polymer disposed thereon. Combining includes infiltrating a fiber composite of the present disclosure with a liquid a polymer matrix/resin that is then cured/solidified (e.g., by heating or cooling) to form a continuous solid matrix. For example, a thermosetting polymer is cured by heating or a thermoplastic is crystallized by cooling. Alternatively, single fibers or a composite of fibers (e.g., tows of fibers or sheets of aligned fibers) is coated or intermingled with solid polymer matrix/resin or polymer matrix/resin precursor, and the second composition is formed by flowing the coatings together (and curing if required) under heat and pressure.

In at least one aspect, a polymer is a thermosetting polymer or thermoplastic polymer. Thermosetting polymers are long-chain molecules that cure by cross-linking to form a three dimensional network which does not readily melt or reform. These polymers can provide fabrication of compositions at relatively low temperatures and pressures because they pass through a low-viscosity stage before polymerization and cross-linking (if any). In at least one aspect, a polymer matrix resin is at least one of an epoxy, a bismaleimide, or a polyaryletherketone (such as a polyetheretherketone or a polyetherketone).

Epoxies have sufficient mechanical properties for example, for use as aircraft coatings and other applications where mechanical properties can be important, have low shrinkage and form adequate bonds to fibers. Epoxies pass through a low-viscosity stage during the cure, which provides the use of liquid resin-forming techniques such as resin-transfer molding. Compositions comprising epoxies that cure at 120° C. and 180° C. can have upper service temperatures of about 100° C. to about 150° C.

Bismaleimide resins have desirable formability and mechanical properties similar to epoxies and can operate at higher temperatures than epoxies. Compositions comprising bismaleimide that cure at about 200° C. can have upper service temperatures above 180° C.

A polymer matrix/resin of the present disclosure can be a thermoplastic polymer. Thermoplastic polymers are linear (non-crosslinked) polymers that can be melted and reformed. High-performance thermoplastics for use as aircraft coatings include polymers such as polyetheretherketone which can be cured up to about 120° C., polyetherketone which can be cured up to about 145° C., and polyimide which can be cured up to about 270° C. Thermoplastic polymers are advantageous because they have higher strains to failure than thermoset polymers because thermoplastic polymers can undergo plastic deformation.

Because thermoplastic polymers are already polymerized, they can form very high viscosity liquids when melted. Fabrication techniques can be based on resin-film (or resin-fiber) infusion and pre-preg techniques. The fibers are coated with the polymer (from a solvent solution) and the resulting part is then consolidated under high temperature and pressure. Alternatively, sheets of thermoplastic film can be layered between sheets of dry fiber or fibers of thermoplastic can be woven through the carbon fibers and the composite consolidated by hot pressing. Furthermore, because thermoplastics absorb very little moisture, they have better hot/wet property retention than thermosetting composites, but do involve higher temperature processing.

A polymer matrix/resin of the present disclosure forms the shape of the composition and can transfer load into and out of the fibers, can separate the fibers so adjacent fibers are protected if one fails, and/or can protect the fiber from the surrounding environment. The fiber can interact with (e.g., bond to) the polymer matrix/resin to provide toughness to the overall composition. The location(s) where the fiber interacts with the polymer can be referred to as the interface or interphase.

Combining a fiber or fiber composite with a polymer resin/matrix to form a composition of the present disclosure can include impregnating or coating (e.g., dipping or spraying) a fiber (or fiber composite) with a liquid polymer to form a mixture that is then cured. This can be referred to as resin-transfer molding and can be used, for example, if the polymer has a low-viscosity (e.g., less than 1,000 centipoise (cps)).

Alternatively, combining a fiber (or fiber composite) with a polymer matrix/resin to form a composition of the present disclosure can include infusing a melted polymer film into a fiber (or fiber mat) under pressure and then curing. This can be referred to as resin-film infusion.

Alternatively, combining a fiber (or fiber composite) of the present disclosure with a polymer resin/matrix to form a composition can include pre-impregnating fiber sheet bundles or tows with a liquid resin (pre-preg) for subsequent arrangement (stacking) followed by consolidation and cure under temperature and pressure. For thermoset composites starting at room temperature, the temperature can be increased up to a temperature of about 350° F.), the pressure of the environment is increased (e.g., up to about 200 psi), and the high temperature, high pressure condition is maintained for up to several hours depending on the material, then is allowed to cool to room temperature/ambient pressure.

In at least one aspect, a plurality of cured compositions (e.g., metal coated fibers having polymer disposed thereon and impregnated or coated with a liquid polymer matrix/resin) are stacked and consolidated at a temperature from about 250° F. to about 600° F. to form a consolidated composition.

As shown at block 214, method 200 includes depositing a composition of the present disclosure onto a metal substrate. Metal substrates include steel, aluminum, titanium, magnesium, tantalum, copper, and alloys thereof. Depositing can include any suitable "lay up" process or "collation" process known in the art. For example, a composition of the present disclosure can be cut to match the shape of a metal substrate and deposited onto the metal. The deposited composition is "debulked" by placing the deposited composition in a vacuum bag and pulled to a pressure of 980 mbar or greater for a time period from about 1 minute to about 30 minutes. The composition can be deposited as tiles or as a continuous piece. A breather material can be used and can connect to the vacuum ports of the vacuum bag.

At block 216, the composition is cured, to fabricate a part, such as a coated vehicle component of a vehicle, such as an aircraft, a car, a train, a boat, or a wind turbine. In at least one aspect, a composition of the present disclosure is cured at a temperature from about 20° C. to about 300° C., such as from about 100° C. to about 200° C. A vehicle component is any suitable component of a vehicle, such as a structural component, such as landing gear(s), a panel, or joint, of an aircraft, etc. Examples of a vehicle component include a rotor blade, an auxiliary power unit, a nose of an aircraft, a fuel tank, a tail cone, a panel, a coated lap joint between two or more panels, a wing-to-fuselage assembly, a structural aircraft composite, a fuselage body-joint, a wing rib-to-skin joint, and/or other internal component. In at least one aspect, a vehicle is an aircraft, a car, a train, or a boat. In at least one aspect, a part is a part of a wind turbine.

Figure 4:
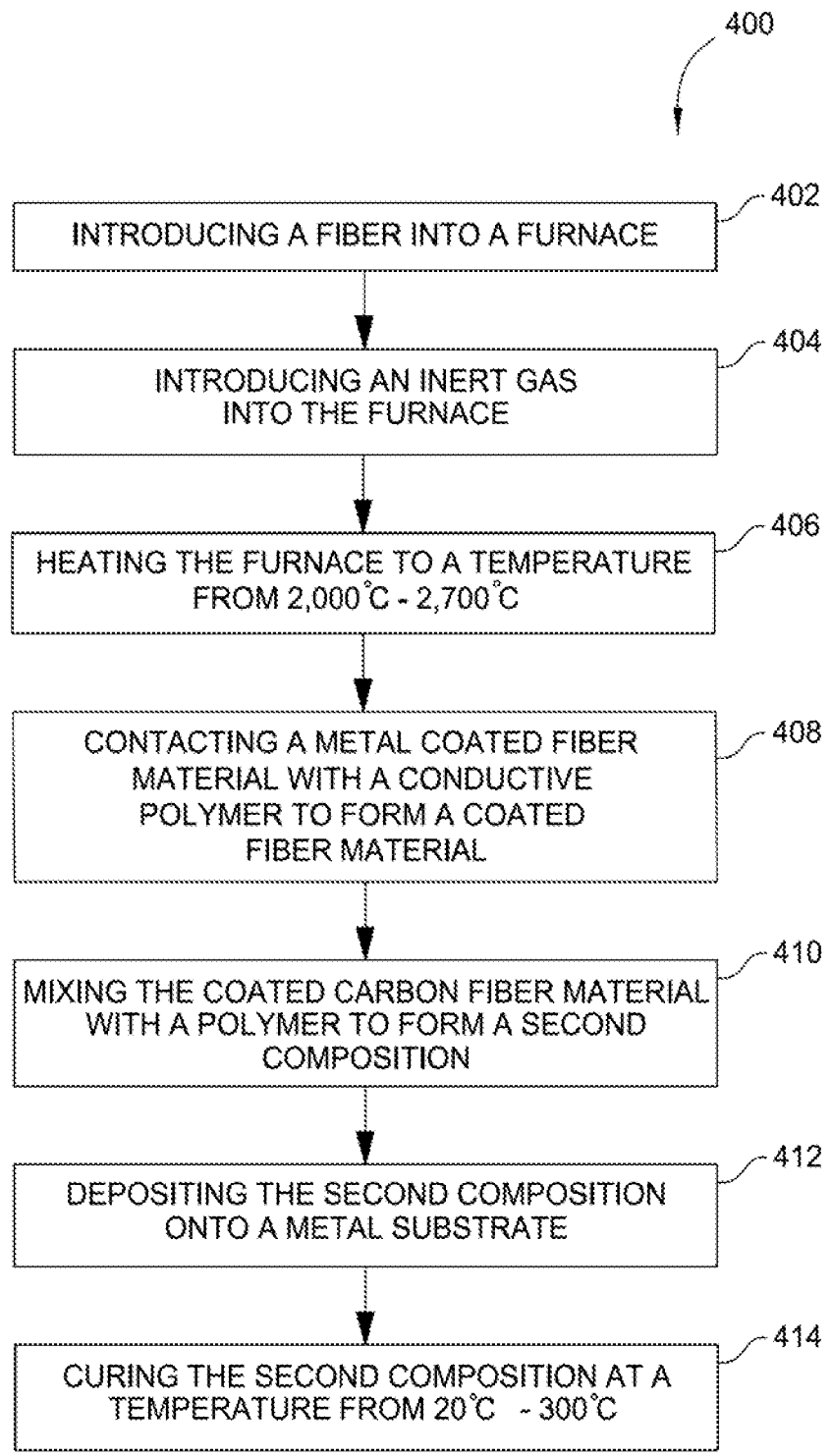
FIG. 4 is a flow diagram of a method for manufacturing components having compositions of the present disclosure disposed thereon, according to one aspect.

FIG. 4 is a flow diagram of a method 400 for manufacturing components having compositions of the present disclosure disposed thereon. As shown in FIG. 4, method 400 includes introducing a fiber into a furnace (Block 402), introducing an inert gas into the furnace (Block 404), and heating the furnace to a temperature from about 2,000° C. to about 2,700° C. (Block 406). Method 400 includes contacting a metal coated fiber material with a conductive polymer to form a first composition comprising a metal coated fiber having a conductive polymer disposed thereon (Block 408). Method 400 includes mixing the first composition with a polymer matrix resin to form a second composition (Block 410). Method 400 includes depositing the second composition onto a metal substrate (Block 412). Method 400 includes curing the second composition at a temperature from about 20° C. to about 300° C. (Block 414).

ASPECTS

Clause 1. A composition comprising:
a conductive polymer; and
a fiber material comprising one or more metals disposed thereon.

Clause 2. The composition of Clause 1, further comprising a polymer matrix or resin.

Clause 3. The composition of Clauses 1 or 2, wherein the composition comprises the polymer matrix or resin from about 50 wt % to about 99 wt % based on the total weight of the composition.

Clause 4. The composition of any of Clauses 1-3, wherein the conductive polymer is selected from a polyaniline, a poly(ethylenedioxythiophene), a polypyrrole, or mixtures thereof.

Clause 5. The composition of any of Clauses 1-4, wherein the composition comprises the conductive polymer and metal coated fiber at a % loading from about 1 wt % to about 30 wt % based on the total weight of the composition.

Clause 6. The composition of any of Clauses 1-5, wherein the metal is selected from nickel, titanium, palladium, iron, cobalt, copper, aluminum, chromium, or mixtures thereof.

Clause 7. The composition of any of Clauses 1-6, wherein a ratio of conductive polymer to metal coated fiber is from about 0.002:1 to about 4:1.

Clause 8. The composition of any of Clauses 1-7, wherein the fiber is selected from a carbon, a nylon, a fiberglass, a polyacrylonitrile, or combinations thereof.

Clause 9. The composition of any of Clauses 1-8, wherein the polymer matrix or resin is selected from a polyurethane, an epoxy, a thermosetting polymer, a thermoplastic polymer, a rubber, a bismaleimide, a polyimide, a polyaryletherketone, or combinations thereof.

Clause 10. The composition of any of Clauses 1-9, wherein the polymer matrix or resin is an epoxy.

Clause 11. The composition of any of Clauses 1-10, wherein the composition is a composite.

Clause 12. The composition of any of Clauses 1-11, wherein the composite is disposed on a component and the composite has a thickness of from 0.01 µm to about 100 µm in thickness.

Clause 13. The composition of any of Clauses 1-12, wherein the composite has a resistance of from about 0.01 ohms/square (Ω/□) to about 25 MΩ/□.

Clause 14. The composition of any of Clauses 1-13, wherein the component is a vehicle component.

Clause 15. The vehicle component of any of Clauses 1-14, wherein the vehicle component is a rotor blade, a landing gear, an auxiliary power unit, a nose of an aircraft, a fuel tank, a tail cone, a panel, a coated lap joint between two or more panels, a wing-to-fuselage assembly, a structural aircraft composite, a fuselage body-joint, or a wing rib-to-skin joint.

Clause 16. A method for manufacturing a component, comprising:
  contacting a metal coated fiber material with an oxidizing agent and a monomer to form a first composition comprising a metal coated fiber material and a conductive polymer; and
  contacting the first composition with a polymer matrix or resin to form a second composition.

Clause 17. The method of Clause 16, wherein the oxidizing agent is an iron-containing oxidizing agent, cerium-containing oxidizing agent, or sodium-containing oxidizing agent.

Clause 18. The method of Clauses 16 or 17, wherein the oxidizing agent is selected from iron-para-toluenesulfonate, iron permanganate, iron sulfate, iron dichromate, cerium (IV) sulfate, sodium dichromate, ammonium persulfate, or mixtures thereof.

Clause 19. The method of any of Clauses 16-18, further comprising heating the first composition to a temperature of from about 40° C. to about 80° C.

Clause 20. The method of any of Clauses 16-19, further comprising heating the second composition to a temperature of from about 40° C. to about 80° C.

Clause 21. The method of any of Clauses 16-20, wherein the conductive polymer is selected from a polyaniline, a poly(ethylenedioxythiophene), a polypyrrole, or mixtures thereof.

Clause 22. The method of any of Clauses 16-21, wherein the metal is selected from nickel, titanium, palladium, iron, cobalt, copper, aluminum, chromium, or mixtures thereof.

Clause 23. The method of any of Clauses 16-22, wherein the fiber is selected from a carbon, a nylon, a fiberglass, a polyacrylonitrile, or combinations thereof.

EXAMPLES

The electrical conductivity of ordinary metal coated fibers in a matrix resin is dependent on percolation which is governed by % loading and aspect ratio of the fiber. It was discovered that the conductive polymer coating can bridge the fibers and provide higher electrical conductivity and lower loadings of fiber into a composition (such as a composite), which provides weight savings (e.g., hundreds of pounds) for aircraft structural components.

Materials: 3,4-Ethylenedioxythiophene (97%; Alfa Aesar) (EDOT); iron (III) (p-toluenesulfonate) (Fe(III)(PTSA)$_3$) (Sigma); butyl acetate (BuAc) (Sigma); isopropanol (IPA); PEDOT-PSSA (Clevios); PR1664 Polyurethane (PPG), Parts A and B.

PROCEDURES

1. Poly(3,4-ethylenedioxythiophene) p-toluenesulfonate (PEDOT-PTSA) Coated NiCF

Procedure 1

8.3% w/w FePTSA IPA solution was prepared by dissolving 7.3 grams of FePTSA in 81.1 grams of IPA. 19.8% w/w EDOT solution in BuAc was prepared by dissolving 22.1 grams of EDOT in 89.8 grams of BuAc.

Figure 6A:
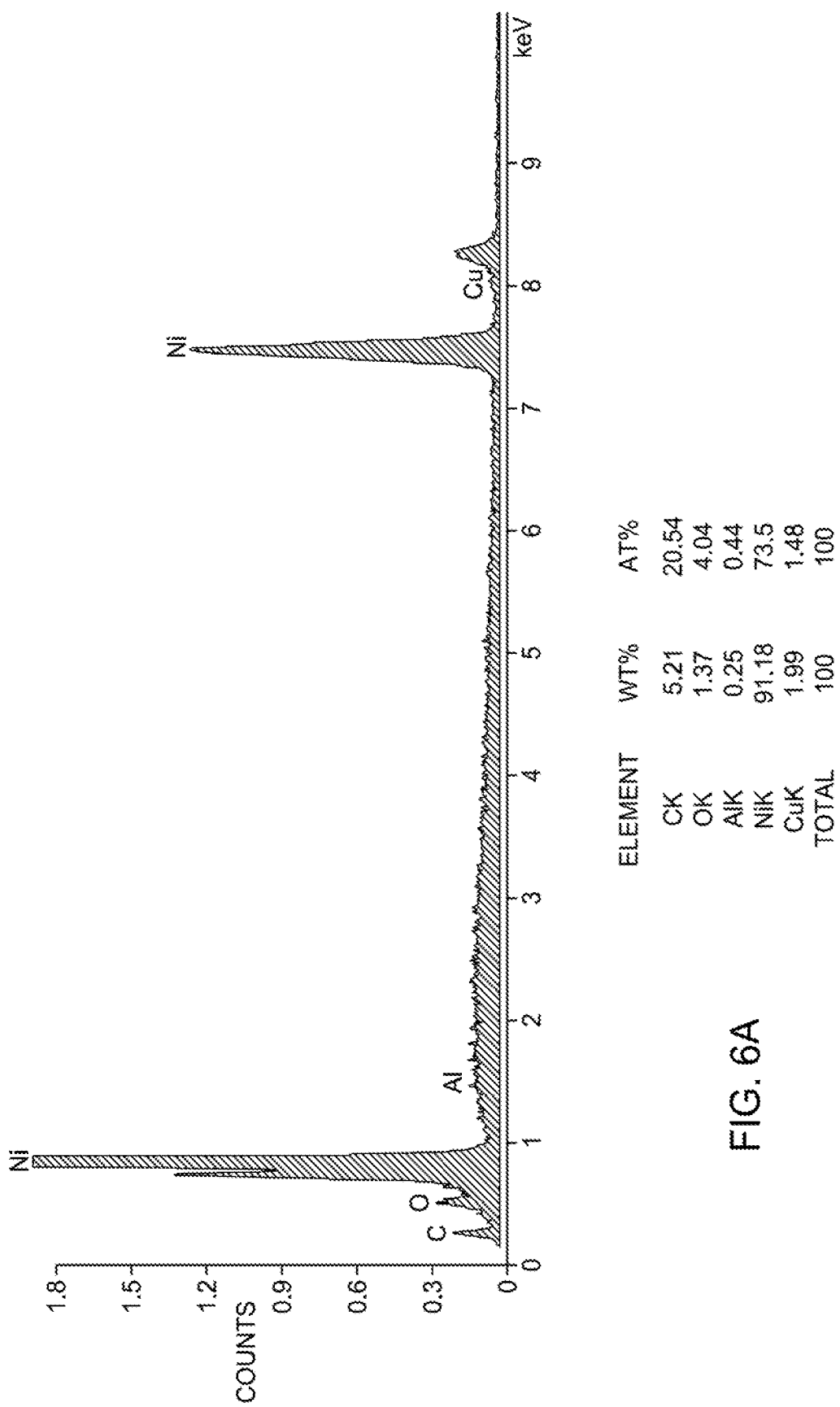
FIG. 6A is an energy-dispersive X-ray spectroscopy (EDS) spectrum of NiCF as received, according to one aspect.
Figure 6B:
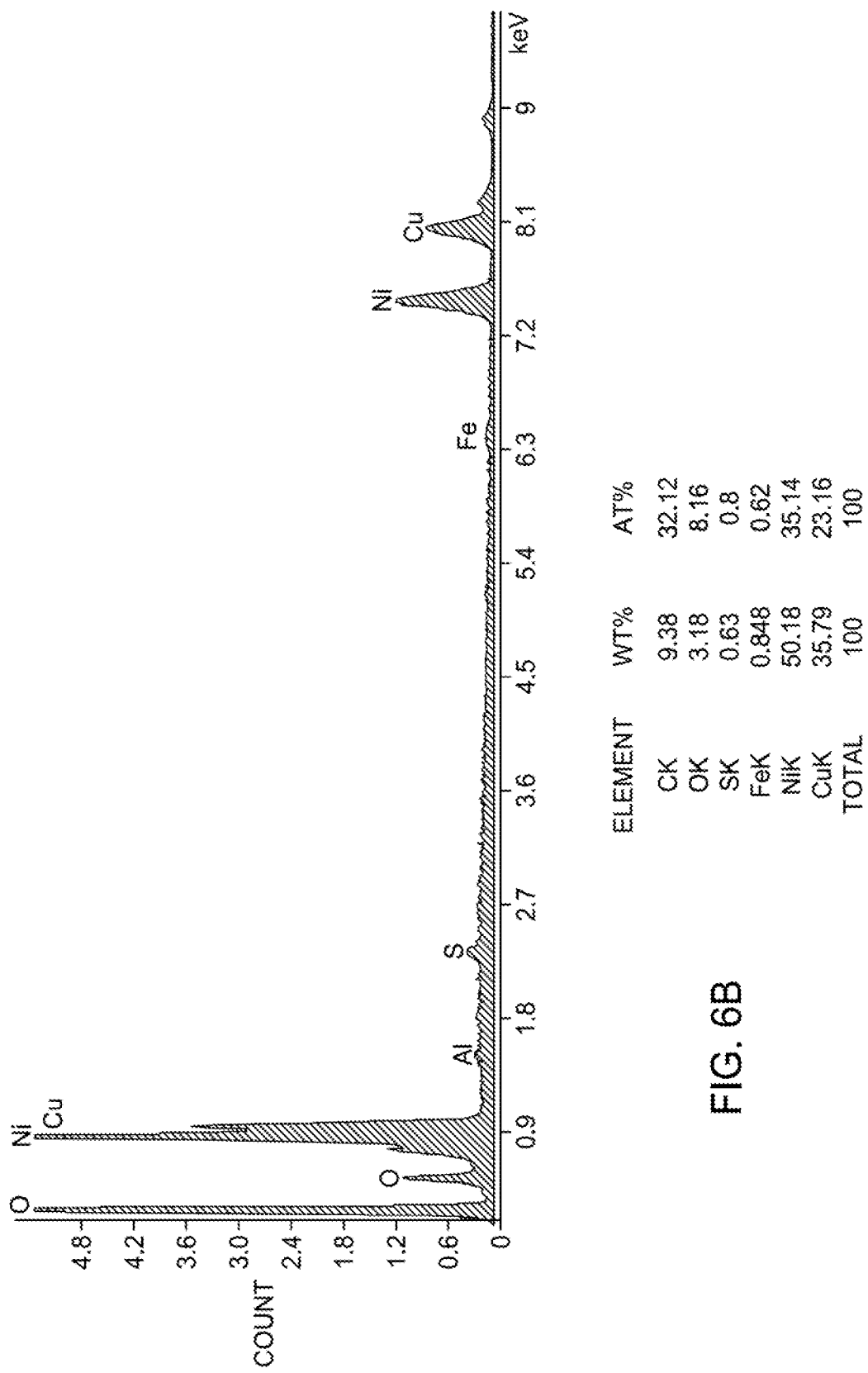
FIG. 6B is an EDS spectrum of NiCF-Fe-PTSA, according to one aspect.

1.87 grams of NiCF was dispersed into 11.45 grams of the FePTSA solution using a vortex mixer. It was then heated on a hot plate at 60° C. with stirring for 24 hours. 2.29 grams of the NiCF-Fe-PTSA powder was recovered by vacuum filtration and air dried. FIG. 6A is an energy-dispersive X-ray spectroscopy (EDS) spectrum of NiCF as received. FIG. 6B is an energy-dispersive X-ray spectroscopy (EDS) spectrum of NiCF-Fe-PTSA.

Figure 6C:
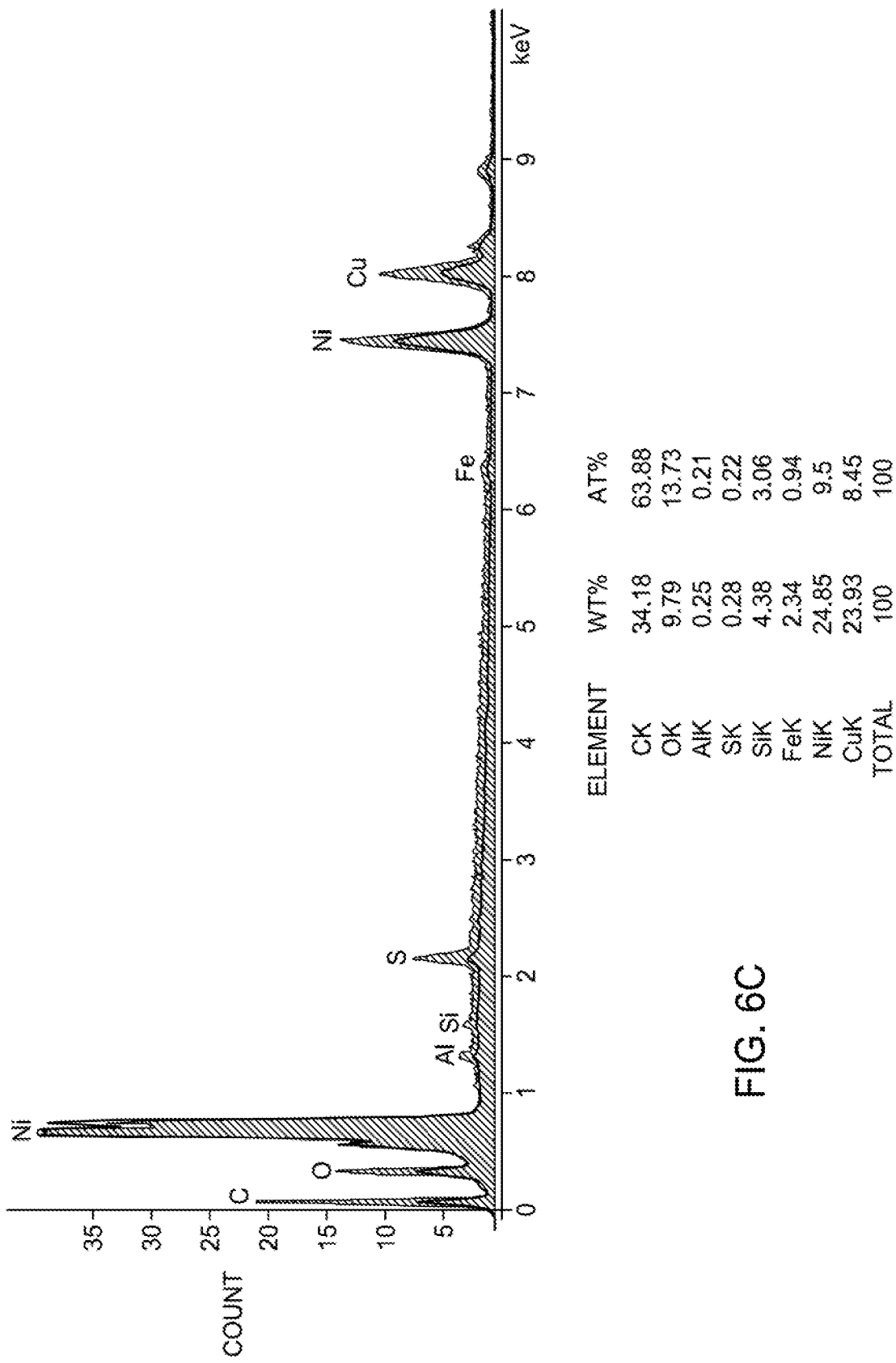
FIG. 6C is an EDS spectrum of PEDOT-NiCF, according to one aspect.

36.72 grams of the EDOT solution was then added to 2.29 grams of NiCF-Fe-PTSA and heated 2 hours at 60 C with stirring. 2.02 grams of the PEDOT coated NiCF was recovered by vacuum filtration and dried under vacuum at 60° C. FIG. 6C is an energy-dispersive X-ray spectroscopy (EDS) spectrum of PEDOT-NiCF. The solid line shown in FIG. 6C is the average of all of the data.

Figure 5:
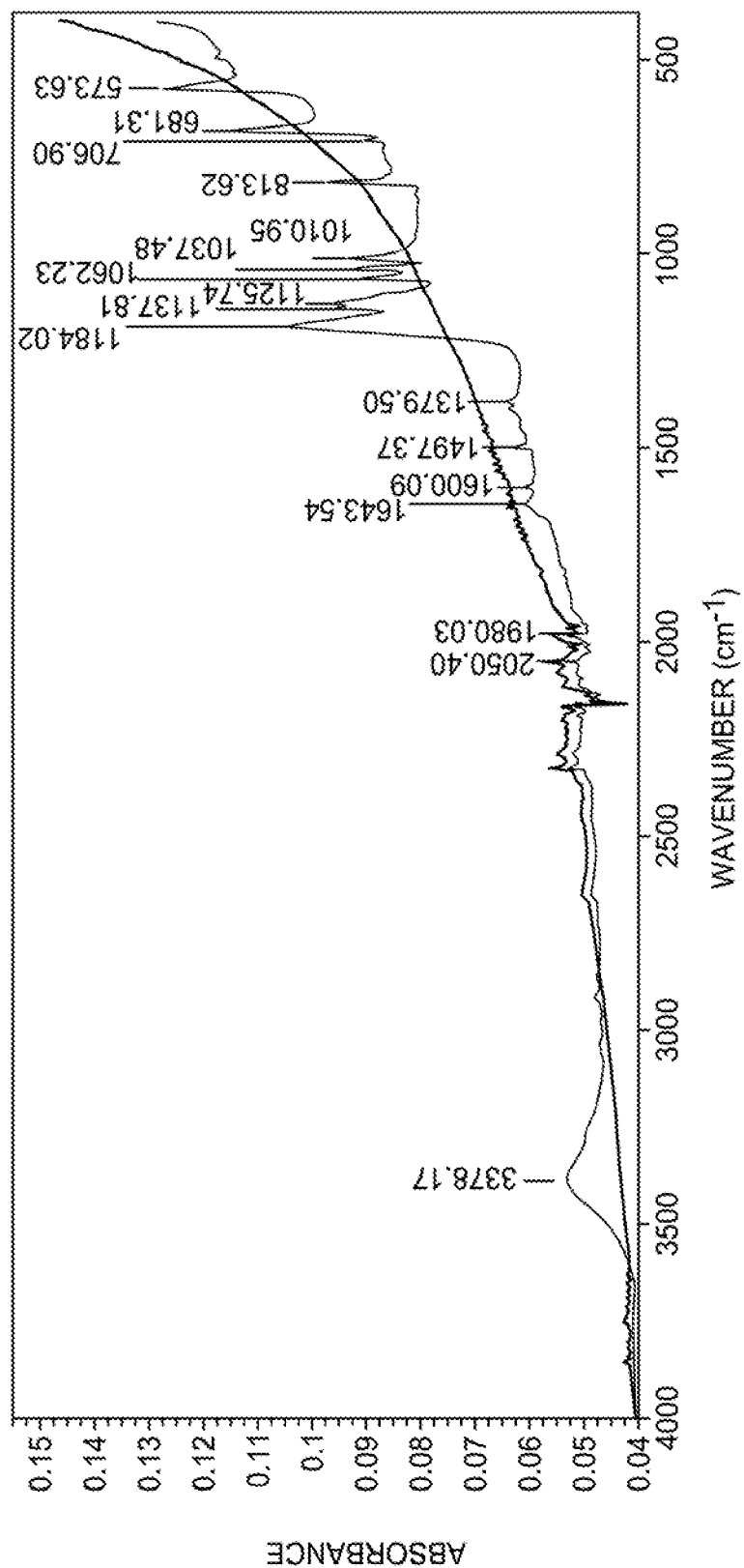
FIG. 5 is overlapped fourier-transformed infrared spectroscopy (FTIR) spectra of the PEDOT-NiCF and NiCF, according to one aspect.

Fourier-transformed infrared spectroscopy (FTIR) spectra of the PEDOT-NiCF and NiCF were obtained and are shown (as overlapping spectra) in FIG. 5. NiCF (thick curve) and PEDOT-NiCF (thin curve). The FTIR spectra indicate formation of a PEDOT-PTSA coating on the NiCF.

Procedure 2

7.0 grams of FePTSA was dissolved in 73 grams of acetonitrile. 18.1 grams of NiCF was added to the solution to form a second solution that was roller milled for 24 hours. The product was recovered by vacuum filtration, washed three times with acetonitrile and air dried. 21.52 grams of product (FeNiCF) was recovered.

24.3 grams of EDOT was dissolved in 101.6 grams of butylacetate. 5.24 grams of the FeNiCF prepared above was then mixed into 105.4 grams of the EDOT solution to form a second solution that was roller milled for 19 hours. 5.08 grams of product (PEDOT-NiCF) was recovered by vacuum filtration after drying for 24 hours at 70° C. An FTIR spectrum (not shown) was obtained and also indicated PEDOT-PTSA coating on the NiCF.

2. Poly(3,4-ethylenedioxythiophene) polystyrene sulfonate (PEDOT-PSSA) Coated NiCF 10 grams of PEDOT-PSSA (Clevios PHC V4 available from H. C. Starck GmbH) was dissolved in 400 ml of DI water. 1 gram of NiCF was added to 7.5 grams of the PEDOT-PSSA solution to form a second solution. The mixture was sonicated for 5 minutes, placed in a watch glass, and air dried at 71° C. The PEDOT appeared to substantially accumulate ("glob" or "gel") onto the NiCF.

An FTIR spectrum (not shown) was obtained of the PEDOT-PSSA NiCF recovered above which did not show any characteristic PEDOT peaks likely because of the substantial accumulation of the polymer onto the NiCF, highlighting an advantage of a template polymerization process of the present disclosure.

Resistance Measurements

Powders were carefully spread to cover a serpentine electrical circuit and resistances (R) measured in ohms are shown in Table 1.

TABLE 1

|  | Sample | NBP | R |
|---|---|---|---|
| 1 | PEDOT-PTSA-NiCF | 87 | 9.26 |
| 2 | PEDOT-PTSA-NiCF | 91 | 7.25 |
| 3 | PEDOT-PTSA-NiCF | 91 | 3.22 |
| 4 | PEDOT-PTSA-NiCF | 91 | 8.9 |
| 5 | PEDOT-PTSA-NiCF | 91 | 3.52 |
| 6 | PEDOT-PTSA-NiCF | 91 | 9.49 |
| 7 | PEDOT-PTSA | 95 | 19.7 |
| 8 | PEDOT-PSS-NiCF | 99 | 18.3 |
| 9 | NiCF | 99 | 16 |
| 10 | NiCF | 99 | 28.9 |
| 11 | NiCF | 99 | 22.8 |
| 12 | NiCF | 99 | 35.8 |

Films were cast onto microscope slides and resistances measured (ohms/square) using an Ohm meter:

| NiCF | 6.5 ohms/square |
|---|---|
| PEDOT-NiCF | 2.1 ohms/square |

Thicknesses of both films were about the same. Therefore, the data show an increase in conductivity of the film by about a factor of 3.

JMP 13 Analysis

A JMP Analysis is a method to determine if differences in responses are statistically significant. JMP is a business unit of SAS (Campus Drive, Cary, NC 27513) and version 13 of the software was used.

A JMP analysis is a way to examine relationships between a continuous Y and a categorical X variable. Using the Oneway or Fit Y by X platform, one can explore how the distribution of a continuous Y variable differs across groups defined by a single categorical X variable. For example, one might want to find out how different categories of the same type of drug (X) affect patient pain levels on a numbered scale (Y). The Oneway platform is the continuous by nominal or ordinal personality of the Fit Y by X platform. The analysis results appear in a plot, and one can interactively add additional analyses, such as the following: a one-way analysis of variance to fit means and to test that they are equal; nonparametric tests; a test for homogeneity of variance; multiple-comparison tests on means, with means comparison circles; outlier box plots overlaid on each group; power details for the one-way layout.

Overview of Oneway JMP Analysis

A one-way analysis of variance tests for differences between group means. The total variability in the response is partitioned into two parts: within-group variability and between-group variability. If the between-group variability is large relative to the within-group variability, then the differences between the group means are considered to be significant.

JMP Analysis for PEDOT-PTS-NiCF

Figure 7:
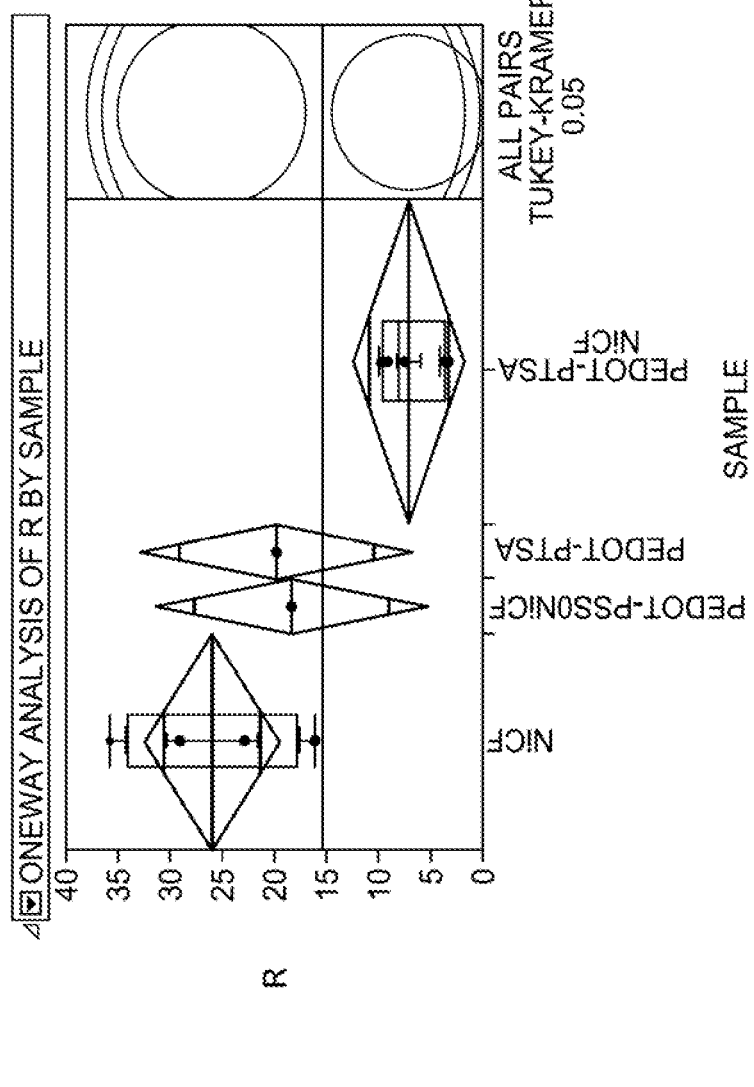
FIG. 7 is a statistical analysis readout for Examples of the present disclosure, according to one aspect.

FIG. 7 is a JMP analysis readout for Examples of the present disclosure. JMP analysis of the data for the Examples of the present disclosure indicate that the PEDOT-PTS-NiCF materials synthesized using Procedures 1 and 2 have a statistically significant lower resistance (using Tukey Kramer analysis) compared to the NiCF (almost a factor of 3).

Formulation of NiCF into Polyurethane Matrix 1.5 grams of PR1664 Part B was dissolved in 1.8 grams of dimethylcarbonate (DMC). 1.5 grams of NiCF powder was then added to the DMC solution and mixed on the Thinky mixer. 0.3 grams of PR1664 Part A was added to the NiCF dispersion and mixed again on the Thinky mixer. This coating method provided an efficient mixing and coating method for modified and unmodified NiCF into a polyurethane matrix.

Table 2 illustrates resistance measurements of examples at varying amounts of loading of NiCF and optionally a conductive polymer (5 wt % to 20 wt % total) disposed in polyurethane. Coating the NiCF using polyaniline was accomplished by mixing the PANI dissolved in toluene with NiCF (followed by removal of toluene).

TABLE 2

| Solvent | % loading in polyurethane resin | Conductive Polymer | Resistance at 1 Hz (Ω) | Weight ratio range of conductive polymer to NiCF |
|---|---|---|---|---|
| Toluene | NiCF-5% | No Conductive Polymer | 7.77E+09 | n/a |
| Toluene | NiCF-5%-PANI | PANI-DNNSA | 4.40E+01 | Max: 2:1 Min: 0.002:1 |
| Toluene | NiCF-10% | No Conductive Polymer | 3.96E−01 | n/a |
| Toluene | NiCF-10%-PANI | PANI-DNNSA | 3.70E−01 | Max: 2:1 Min: 0.002:1 |
| Toluene | NiCF 10%-PEDOT | PEDOT | 3.80E+00 | Max: 4:1 Min: 0.004:1 |
| Toluene | NiCF-20% | No Conductive Polymer | 4.01E−01 | n/a |
| Toluene | NiCF-20%-PANI | PANI-DNNSA | 1.67E+00 | Max: 2:1 Min: 0.002:1 |
| Toluene | NiCF-20%-PEDOT | PEDOT | 6.17E+00 | Max: 4:1 Min: 0.004:1 |

Coating of NiCF with PEDOT-PTSA was demonstrated using an oxidative surface polymerization process (a template polymerization process). The resulting coating was shown to enhance the conductivity of the NiCF powder by a factor of three. This new structure will allow formulations of higher electrical conductivity per gram of NiCF and thus lighter weight coatings with enhanced electrical properties.

Overall, compositions and methods of the present disclosure provide compositions comprising a metal coated fiber and a conductive polymer, which can enhance the electrical conductivity of the fiber when it is incorporated into a polymer matrix or resin, which can provide substantial weight savings when, for example, a composition of the present disclosure is a composite disposed on a metal surface, such as a vehicle component. Compositions (and composites) of the present disclosure can also provide improved overall composite component strength and ductility while maintaining or improving composite electrical properties, as compared to, for example, conventional composites.

The descriptions of the various aspects of the present disclosure have been presented for purposes of illustration, but are not intended to be exhaustive or limited to the aspects disclosed. Many modifications and variations will be apparent to those of ordinary skill in the art without departing from the scope and spirit of the described aspects. The terminology used herein was chosen to best explain the principles of the aspects, the practical application or technical improvement over technologies found in the marketplace, or to enable others of ordinary skill in the art to understand the aspects disclosed herein. While the foregoing is directed to aspects of the present disclosure, other and further aspects of the present disclosure may be devised without departing from the basic scope thereof.

What is claimed is:

1. A method for manufacturing a composition, comprising:
forming a coating of a conductive polymer on an oxidized metal-coated carbon fiber, wherein the conductive polymer is selected from the group consisting of a polyaniline (PANI), a poly(ethylenedioxythiophene) (PEDOT), a polypyrrole, a polyfluorene, a polyphenylene, a polypyrene, a polyazulene, a polynaphthalene, a polyacetylene (PAC), a poly(p-phenyl vinylene) (PPV), a polycarbazole, a polyindole, a polyazepine, and a polythiophene, and wherein the oxidized metal-coated carbon fiber comprises about 15 wt % to about 70 wt % of oxidized metal, based on the total weight of the oxidized metal and the carbon fiber; and
contacting the conductive polymer-coated oxidized metal-coated carbon fiber with a polymer matrix or resin to form a composition comprising about 50 wt % to about 99 wt % of the polymer matrix or resin based on the total weight of the composition.

2. The method of claim 1, further comprising heating the composition to a temperature of from about 40° C. to about 80° C.

3. The method of claim 1, wherein the conductive polymer is selected from a polyaniline, a poly(ethylenedioxythiophene), a polypyrrole, or mixtures thereof.

4. The method of claim 1, wherein the metal is selected from nickel, titanium, palladium, iron, cobalt, copper, aluminum, chromium, or mixtures thereof.

5. The method of claim 1, wherein the polymer matrix or resin is selected from a polyurethane, an epoxy, a thermosetting polymer, a thermoplastic polymer, a rubber, a bismaleimide, a polyimide, a polyaryletherketone, or combinations thereof.

6. The method of claim 5, wherein the polymer matrix or resin is an epoxy.

7. The method of claim 1, wherein the conductive polymer-coated oxidized metal-coated carbon fiber is intermingled within the polymer matrix or resin.

8. The method of claim 1, wherein the carbon fiber comprises carbon fibers having an aspect ratio from about 10 to about 100.

9. The method of claim 1, wherein the composition comprises a resistance from about 0.1 ohms per square to about 25 Megaohms per square.

10. The method of claim 1, further comprising casting or spraying the composition onto a vehicle component to form a layer having a thickness of about 1 micron to about 100 microns.

11. The method of claim 1, further comprising curing the composition at a temperature of about 20° C. to about 300° C.

12. A method, comprising:
forming a coating of a conductive polymer on an oxidized metal-coated carbon fiber, wherein the conductive polymer is selected from the group consisting of a polyaniline, a poly(ethylenedioxythiophene), a polypyrrole, and mixtures thereof, and wherein the oxidized metal-coated carbon fiber comprises about 15 wt % to about 70 wt % of oxidized metal, based on the total weight of the oxidized metal and the carbon fiber; and
contacting the conductive polymer-coated oxidized metal-coated carbon fiber with a polymer matrix or resin to form a composition comprising about 50 wt % to about 99 wt % of the polymer matrix or resin based on the total weight of the composition.

13. The method of claim 12, further comprising heating the composition to a temperature of from about 40° C. to about 80° C.

14. The method of claim 12, wherein the metal is selected from nickel, titanium, palladium, iron, cobalt, copper, aluminum, chromium, or mixtures thereof.

15. The method of claim 12, wherein the polymer matrix or resin is selected from a polyurethane, an epoxy, a thermosetting polymer, a thermoplastic polymer, a rubber, a bismaleimide, a polyimide, a polyaryletherketone, or combinations thereof.

16. The method of claim 12, further comprising depositing the composition on a metal substrate.

17. The method of claim 16, wherein the metal substrate is selected from the group consisting of steel, aluminum, titanium, magnesium, tantalum, and copper.

18. The method of claim 16, further comprising curing the composition deposited on the metal substrate.

19. The method of claim 18, further comprising curing at a temperature of about 20° C. to about 300° C.

20. The method of claim 16, wherein the composition is cured under vacuum or pressure after being deposited on the metal substrate.

* * * * *